US012633574B2

(12) United States Patent
Yu

(10) Patent No.: US 12,633,574 B2
(45) Date of Patent: May 19, 2026

(54) SECONDARY BATTERY AND MANUFACTURING METHOD OF THE SAME

(71) Applicant: LG Energy Solution, Ltd., Seoul (KR)

(72) Inventor: Sung Hoon Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 727 days.

(21) Appl. No.: 17/920,292

(22) PCT Filed: May 13, 2021

(86) PCT No.: PCT/KR2021/006025
§ 371 (c)(1),
(2) Date: Oct. 20, 2022

(87) PCT Pub. No.: WO2021/241924
PCT Pub. Date: Dec. 2, 2021

(65) Prior Publication Data
US 2023/0163363 A1 May 25, 2023

(30) Foreign Application Priority Data
May 29, 2020 (KR) ......................... 10-2020-0064986

(51) Int. Cl.
*H01M 10/0585* (2010.01)
*H01M 10/04* (2006.01)
(Continued)

(52) U.S. Cl.
CPC ..... *H01M 10/0585* (2013.01); *H01M 50/186* (2021.01); *H01M 50/202* (2021.01);
(Continued)

(58) Field of Classification Search
CPC ............. H01M 4/0445; H01M 4/0447; H01M 10/0409; H01M 10/0422; H01M 10/0431;
(Continued)

(56) References Cited

U.S. PATENT DOCUMENTS

| | | | |
|---|---|---|---|
| 6,037,071 A | 3/2000 | Poirier et al. | |
| 7,527,891 B2 | 5/2009 | Janmey | |

(Continued)

FOREIGN PATENT DOCUMENTS

| | | |
|---|---|---|
| CN | 102122702 A | 7/2011 |
| CN | 205542932 U | 8/2016 |

(Continued)

OTHER PUBLICATIONS

Extended European Search Report including Written Opinion for Application No. 21813676.0 dated Jun. 28, 2024, pp. 1-11.
(Continued)

*Primary Examiner* — Matthew W Van Oudenaren
(74) *Attorney, Agent, or Firm* — Lerner David LLP

(57) ABSTRACT

A secondary battery according to one embodiment of the present disclosure includes an electrode assembly impregnated with an electrolyte solution; a battery case that houses the electrode assembly and the electrolyte solution; a cap assembly coupled to the battery case; and a gasket positioned between the battery case and the cap assembly, wherein the gasket includes an indented part formed on the inside, and wherein the indented part is spaced apart from the cap assembly while facing the cap assembly.

13 Claims, 10 Drawing Sheets

100

(51) Int. Cl.

| | |
|---|---|
| *H01M 10/44* | (2006.01) |
| *H01M 50/152* | (2021.01) |
| *H01M 50/186* | (2021.01) |
| *H01M 50/188* | (2021.01) |
| *H01M 50/202* | (2021.01) |
| *H01M 50/267* | (2021.01) |
| *H01M 50/627* | (2021.01) |

(52) U.S. Cl.
CPC ....... *H01M 50/267* (2021.01); *H01M 50/627* (2021.01); *H01M 10/0422* (2013.01); *H01M 10/446* (2013.01); *H01M 50/152* (2021.01); *H01M 50/188* (2021.01)

(58) Field of Classification Search
CPC ............. H01M 10/049; H01M 50/107; H01M 50/152; H01M 50/166; H01M 50/167; H01M 50/179; H01M 50/184; H01M 50/186; H01M 50/188; H01M 50/342; H01M 50/3425; H01M 50/35; H01M 50/358; H01M 50/367; H01M 50/375; H01M 50/394; H01M 50/583
See application file for complete search history.

(56) References Cited

U.S. PATENT DOCUMENTS

| | | | |
|---|---|---|---|
| 7,534,522 B2 | 5/2009 | Chang | |
| 2005/0084744 A1 | 4/2005 | Janmey | |
| 2006/0093904 A1* | 5/2006 | Cheon | H01M 50/171 |
| | | | 429/163 |
| 2009/0214948 A1 | 8/2009 | Cheon | |
| 2011/0129708 A1 | 6/2011 | Doo | |
| 2011/0171507 A1 | 7/2011 | Kim | |
| 2011/0171508 A1* | 7/2011 | Kim | H01M 50/186 |
| | | | 429/185 |
| 2012/0070707 A1 | 3/2012 | Kim | |
| 2019/0148683 A1 | 5/2019 | Kwon et al. | |

FOREIGN PATENT DOCUMENTS

| | | | |
|---|---|---|---|
| CN | 208422973 U | 1/2019 | |
| JP | H05050652 U | 7/1993 | |
| JP | H11031487 A | 2/1999 | |
| JP | 2006128121 A | 5/2006 | |
| JP | 2017224426 A | 12/2017 | |
| JP | 2020024788 A | 2/2020 | |
| KR | 100199679 B1 | 6/1999 | |
| KR | 100646512 B1 | 11/2006 | |
| KR | 101097255 B1 | 12/2011 | |
| KR | 20120029079 A | 3/2012 | |
| KR | 101396703 B1 | 5/2014 | |
| KR | 20160022137 A | 2/2016 | |
| KR | 101831004 B1 | 2/2018 | |
| KR | 20180072990 A | 7/2018 | |
| KR | 20190104687 A | 9/2019 | |
| KR | 102043864 B1 | 11/2019 | |
| WO | 2000067335 A1 | 11/2000 | |

OTHER PUBLICATIONS

International Search Report for PCT/KR2021/006025 mailed Aug. 31, 2021. 3 pgs.
Search Report dated Nov. 28, 2024 from the Office Action for Chinese Application No. 202180027031.4 issued Nov. 29, 2024, 3 pages.

* cited by examiner (a)

(b)

SECONDARY BATTERY AND MANUFACTURING METHOD OF THE SAME

CROSS-REFERENCE TO RELATED APPLICATIONS

This application is a national stage entry under 35 U.S.C. § 371 of International Application No. PCT/KR2021/006025, filed on May 13, 2021, which claims priority to Korean Patent Application No. 10-2020-0064986, filed on May 29, 2020, the disclosures of which are hereby incorporated herein by reference in their entireties.

TECHNICAL FIELD

The present disclosure relates to a secondary battery and a method for manufacturing the same, and more particularly, to a secondary battery that can discharge gas generated during the activation step, and a method for manufacturing the same.

BACKGROUND

As the demands for portable electronic products such as notebooks, video cameras and cellular phones are rapidly increased in these days, and development of electric vehicles, energy storage batteries, robots, satellites, etc. is under active progress, numerous studies are being made on secondary batteries being used as the driving power source.

The electrode assembly mounted in the battery case is a power generating element, having a cathode/separator/anode stack structure, which can be charged and discharged, and the electrode assembly is classified into a jelly-roll type, a stacked type and a stacked/folded type. The jelly-roll type electrode assembly is configured to have a structure in which a long sheet type cathode and a long sheet type anode, to which active materials are applied, are wound in a state where a separator is interposed between the cathode and the anode, the stacked type electrode assembly is configured to have a structure in which a large number of cathodes having a predetermined size and a large number of anodes having a predetermined size are sequentially stacked in a state in which separators are interposed between the cathodes and the anodes, and the stacked/folded type electrode assembly is a combination of the jelly-roll type electrode assembly and the stacked type electrode assembly. Among them, the jelly-roll type electrode assembly has advantages in that manufacturing is easy and an energy density per unit weight is high.

Based on the shape of a battery case, a secondary battery is classified into a cylindrical battery where an electrode assembly is built into a cylindrical metal can, a prismatic battery where an electrode assembly is built into a prismatic metal can, and a pouch-type battery where an electrode assembly is built into a pouch type case formed of an aluminum laminate sheet. Among them, the cylindrical battery has an advantage in that it has a relatively large capacity and is structurally stable.

Such a secondary battery includes, for example, nickel-cadmium battery, nickel hydrogen battery, nickel zinc battery, lithium secondary battery, and the like. Among these, since the lithium secondary battery has the advantages in that it has almost no memory effect compared to nickel-based secondary battery and thus, can be charged and discharged freely, and have very low self-discharge rate, high operating voltage, and high energy density per unit weight, it is widely used in the field of advanced electronic devices.

FIG. 1 is a partial cross-sectional view of an upper part of a conventional cylindrical secondary battery.

Referring to FIG. 1, a jelly roll-type electrode assembly 50 is housed in a cylindrical case 20, and a cap assembly 30 can be mounted onto an open upper part of the cylindrical case 20 to manufacture a cylindrical secondary battery 10. Specifically, a gasket 40 is positioned between the cap assembly 30 and the cylindrical case 20, and then the cap assembly 30 and the cylindrical case 20 are crimpled and coupled to manufacture a cylindrical secondary battery 10.

The cap assembly 30 includes an upper end cap 31 and a safety vent 32 for internal pressure drop, and the upper end cap 31 and the safety vent 32 for internal pressure drop may form a structure in close contact with each other.

The safety vent 32 may be electrically connected to the electrode assembly 50 via a current interrupt device (CID). A CID gasket 70 can wrap the edge of the current interrupt device 60.

Generally, a lithium secondary battery performs a formation step, that is, an activation step, during the manufacturing process. The activation step is a process of assembling the battery and then performing charging and discharging to activate the battery, wherein lithium ions emitted from the cathode during charging are intercalated while moving to the anode, and at this time, a solid electrolyte interface (SEI) film is formed on the surface of the anode. This activation step is generally performed by repeating charge/discharge with a constant current or constant voltage in a certain range.

In this activation step, a large amount of gas is generated due to the formation of the electrode film or the decomposition of moisture inside the cell. Since the amount of gas generated in the activation step is large and it continuously reacts with the electrode film, a step of discharging the same is necessary, which is called a degas process.

However, referring to FIG. 1 again, the conventional cylindrical secondary battery 10 must maintain airtightness after injection of the electrolyte solution and thus, it is not easy to discharge gas generated in the activation step. Consequently, the internal pressure is easily increased and the battery performance is deteriorated.

Therefore, there is a need to develop a cylindrical secondary battery capable of discharging gas generated in the activation step.

DETAILED DESCRIPTION OF THE INVENTION

Technical Problem

It is an object of the present disclosure to provide a secondary battery that can discharge gas generated during the activation step, and a method for manufacturing the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a secondary battery comprising: an electrode assembly impregnated with an electrolyte solution; a battery case that houses the electrode assembly and the electrolyte solution; a cap assembly coupled to the battery case; and a gasket positioned between the battery case and the cap assembly, wherein the gasket includes an indented part formed on the inside, and wherein the indented part is spaced apart from the cap assembly while facing the cap assembly.

The gasket may include a sealing part that seals between the battery case and the cap assembly while being positioned at one end of the indented part.

The sealing part may make contact with the cap assembly.

A concave-convex part may be formed on a surface where the sealing part makes contact with the cap assembly.

The indented part may be configured to connect in a straight, oblique or zigzag shape along the height direction.

The indented part may increase in width as it goes from one end to the other end. The battery case and the cap assembly are crimped and coupled with the gasket interposed therebetween, so that a crimping part may be formed in the battery case.

According to another embodiment of the present disclosure, there is provided a method for manufacturing a secondary battery, comprising the steps of: housing an electrode assembly inside a battery case; injecting an electrolyte solution into the electrode assembly; positioning a cap assembly and a gasket on the electrode assembly; and charging and discharging the electrode assembly to activate the electrode assembly, wherein the gasket comprises an indented part formed inside, wherein the indented part is spaced apart from the cap assembly while facing the cap assembly, and wherein in the step of activating the electrode assembly, the generated gas is discharged to the outside along the indented part.

The gasket may include a sealing part that seals between the battery case and the cap assembly while being positioned at one end of the indented part.

The method for manufacturing a secondary battery may further include crimping and coupling the battery case and the cap assembly with the gasket interposed therebetween, wherein in the crimping and coupling step, the sealing part may make contact with the cap assembly.

A concave-convex part may be formed on a surface where the sealing part makes contact with the cap assembly.

The method for manufacturing a secondary battery may further include disposing an auxiliary ring on the cap assembly, wherein the auxiliary ring makes contact with the sealing part and interrupts a path formed by the indented part.

The step of disposing an auxiliary ring may be performed before the step of activating the electrode assembly.

Advantageous Effects

According to embodiments of the present disclosure, gas generated in the activation step can be easily discharged by using a gasket in which an indented part is formed, thereby preventing an increase in the internal pressure and a decrease in performance of the secondary battery. In addition, the problems of expansion and deformation of the electrode assembly due to gas, or the problem of inducing lithium precipitation due to residual gas bubbles can be solved.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
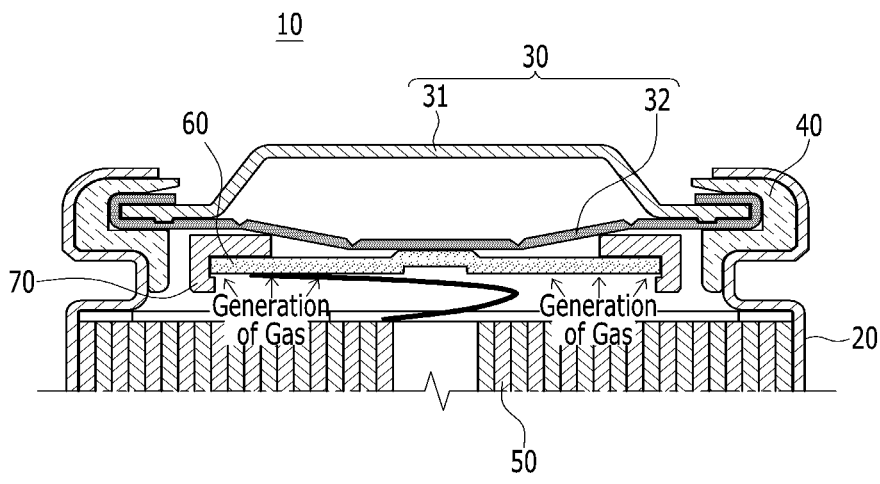
FIG. 1 is a partial cross-sectional view of an upper part of a conventional cylindrical secondary battery.

Hereinafter, various embodiments of the present disclosure will be described in detail with reference to the accompanying drawings so that those skilled in the art can easily implement them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Figure 2:
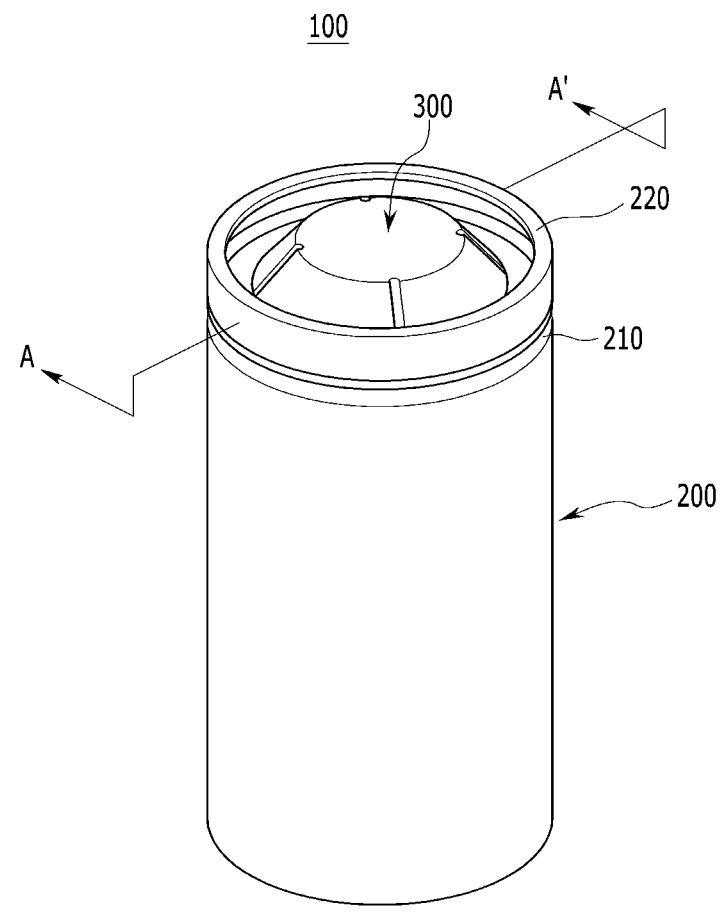
FIG. 2 is a perspective view of a secondary battery according to an embodiment of the present disclosure.
Figure 3:
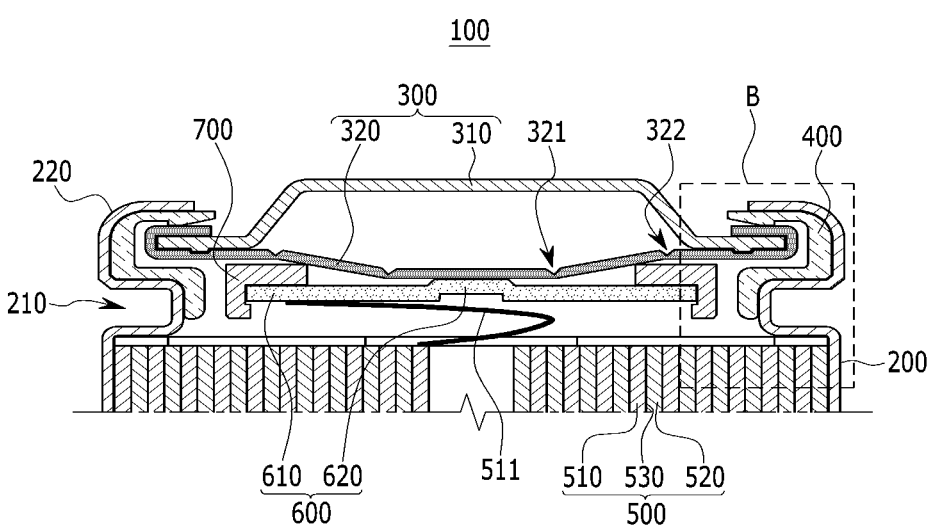
FIG. 3 is a partial cross-sectional view showing a part of the cross-section taken along the cutting line A-A' of FIG. 2.

Further, throughout the specification, when referred to as "planar", it means when a target portion is viewed from the upper side, and when referred to as "cross-sectional", it means when a target portion is viewed from the side of a cross section cut vertically. FIG. 2 is a perspective view of a secondary battery according to an embodiment of the present disclosure. FIG. 3 is a partial cross-sectional view showing a part of the cross-section taken along the cutting line A-A' of FIG. 2.

Referring to FIGS. 2 and 3, a secondary battery 100 according to an embodiment of the present disclosure includes an electrode assembly 500 impregnated with an electrolyte solution, a battery case 200 that houses the electrode assembly 500 and the electrolyte solution, a cap assembly 300 coupled to the battery case 200; and a gasket 400 positioned between the battery case 200 and the cap assembly 300.

First, the electrode assembly 500 has a jelly-roll type structure in which a cathode 510 and an anode 520 are wound with a separator 530 interposed therebetween, and a center pin (not shown) may be inserted in the central part thereof. The center pin is generally made of a metal material in order to impart a predetermined strength, and has a hollow cylindrical structure obtained by bending a plate material in a round shape. The center pin can serve to fix and support the electrode assembly 500 and can serve as a passage for discharging gas generated by an internal reaction during charge/discharge and operation. In particular, the gas generated in the activation step, which will be described later, may move.

The cap assembly 300 includes an upper end cap 310 and a safety vent 320, the upper end cap 310 is positioned on the safety vent 320, and can be electrically connected to the safety vent 320 by forming a structure in close contact with each other. The upper end cap 310 protrudes upward at the center, and is indirectly connected to the cathode 510 of the electrode assembly 500 via a cathode tab 511 and the like, and can perform a function as a cathode terminal by connecting with an external circuit.

The battery case 200 may have a cylindrical shape and may include a beading part 210 and a crimping part 220.

The beading part 210 refers to a portion where a part of the battery case 200 is indented in the center direction of the electrode assembly 500, and is for stably coupling the cap assembly 300 and preventing the electrode assembly 500 from flowing. Here, the central direction of the electrode assembly 500 may mean a radial direction from the outer peripheral surface of the jelly-roll type electrode assembly 500 to the center thereof.

The crimping part 220 is positioned above the beading part 210 and refers to a portion that wraps the cap assembly 300, and is for stable coupling the cap assembly 300. Specifically, the gasket 400 is mounted on the inner surfaces of the crimping part 220 and the beading part 210 to increase the sealing force between the cap assembly 300 and the battery case 200. That is, the gasket 400 is positioned between the battery case 200 and the cap assembly 300, and the end part of the battery case 200 is bent to form the crimping part 220. Thereby, mounting of the cap assembly 300 and sealing of the secondary battery 100 can be performed.

On the other hand, a current interrupt device 600 (CID) and the CID gasket 700 may be positioned under the safety vent 320. The safety vent 320 is a thin film structure through which current flows, and two grooves 321 and 322 having different depths may be formed therein.

The current interrupt device 600 is a member of a conductive plate material, and may include an outer peripheral part 610 and an interrupting part 620 surrounded by the outer peripheral part 610.

Also, although not specifically illustrated, a plurality of through holes for discharging gas may be formed. In an abnormal operating situation, when the pressure inside the secondary battery 100 rises, the interrupting part 620 is separated from the outer peripheral part 610, so that an electrical connection between the external circuit and the electrode assembly 500 may be interrupted.

The CID gasket 700 is a member surrounding the edge of the current interrupt device 600, and may prevent the safety vent 320 from contacting the outer peripheral part 610.

Hereinafter, a gasket in which an indented part is formed according to the present embodiment will be described in detail with reference to FIGS. 4 and 5.

Figure 4:
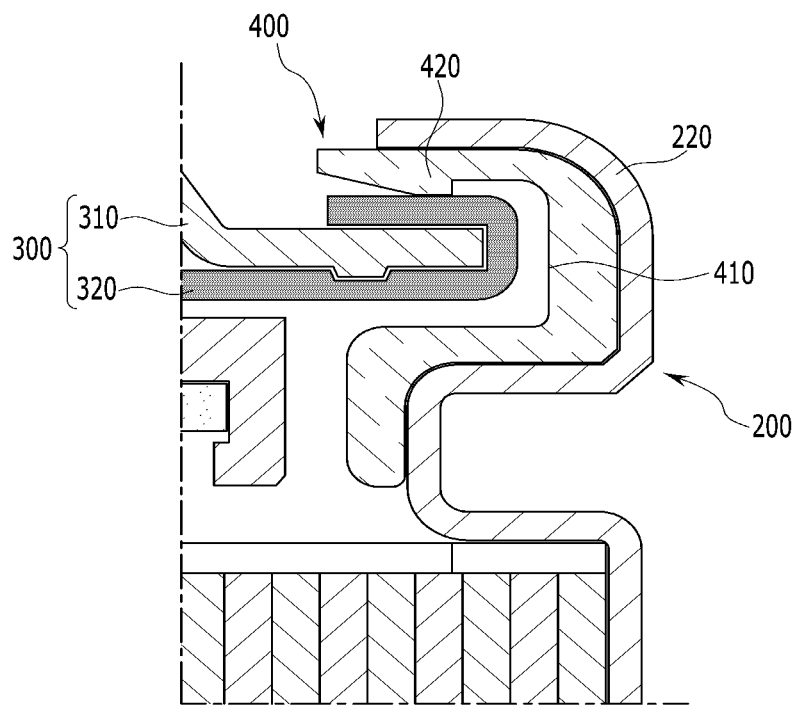
FIG. 4 is a partial cross-sectional view enlarging and showing a section "B" of FIG. 3.
Figure 5:
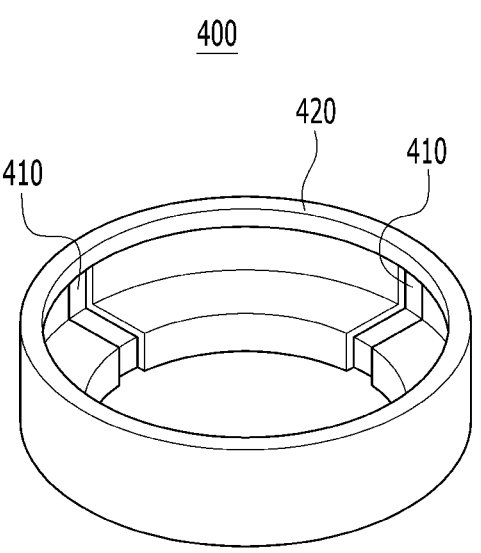
FIG. 5 is a perspective view showing a gasket included in the secondary battery of FIG. 3.

FIG. 4 is a partial cross-sectional view enlarging and showing a section "B" of FIG. 3. FIG. 5 is a perspective view showing a gasket included in the secondary battery of FIG. 3. Referring to FIGS. 4 and 5, the secondary battery according to the present embodiment includes a gasket 400 positioned between the battery case 200 and the cap assembly 300, wherein the gasket 400 includes an indented part 410 formed inside, and the indented part 410 is spaced apart from the cap assembly 300 while facing the cap assembly 300.

The indented part 410 is formed inside the gasket 400, thereby capable of providing a passage through which gas generated in the activation step can move. Thereby, it is possible to prevent an increase in the internal pressure of the secondary battery 100 and a decrease in performance due to gas. Specifically, it is possible to prevent the problems such as expansion and deformation of the electrode assembly, or induction of lithium precipitation due to residual gas bubbles. The details will be described again with reference to FIGS. 8 and 9 below. The gasket 400 may have a circular ring shape in order to surround the cap assembly 300, and the indented part 410 is formed inside the gasket 400 having a circular ring shape, and may be connected in a straight line along the height direction. The number of the indented parts 410 formed in the gasket 400 is not particularly limited and may be configured by a plurality of numbers. However, it is preferable to discharge only the gas generated in the activation step, and in other steps, it is preferable to suppress the inflow to the atmosphere as much as possible, so it is preferable to form by two to four.

Meanwhile, the gasket 400 according to the present embodiment may include a sealing part 420 that seals between the battery case 200 and the cap assembly 300 while being positioned at one end of the indented part 410. This sealing part 420 may make contact with the cap assembly 300, and for this purpose, the sealing part 420 may form a structure protruding inward than the indented part 410. The battery case 200 and the cap assembly 300 are crimped and coupled with the gasket 400 interposed therebetween, whereby a crimping part 220 is formed in the battery case 200, the sealing part 420 of the gasket 400 can seal between the cap assembly 300 and the battery case 200. After gas is discharged via the indented part, the sealing part 420 can interrupt the discharge path via the indented part 410.

Figure 6:
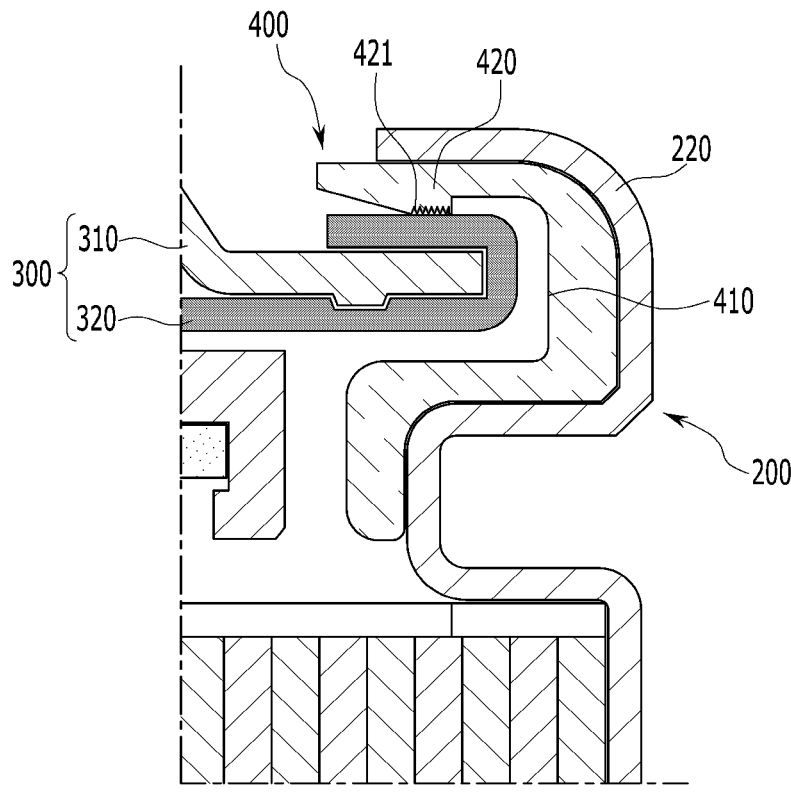
FIG. 6 is a partial cross-sectional view explaining a gasket in which a concavo-convex structure is formed according to a modified embodiment of the present disclosure.

FIG. 6 is a partial cross-sectional view explaining a gasket in which a concavo-convex structure is formed according to a modified embodiment of the present disclosure.

Referring to FIG. 6, a concavo-convex part 421 may be formed on a surface where the sealing part 420 of the gasket 400 according to the present embodiment makes contact with the cap assembly 300. The concave-convex part 421 refers to a region in which a concave part and a convex part are repeatedly formed, and when the concave-convex part

421 is provided on the surface in contact with the cap assembly 300, and the battery case 200 and the cap assembly 300 are crimped and coupled, the degree of sealing between the sealing part 420 and the cap assembly 300 can be increased.

Figure 7:
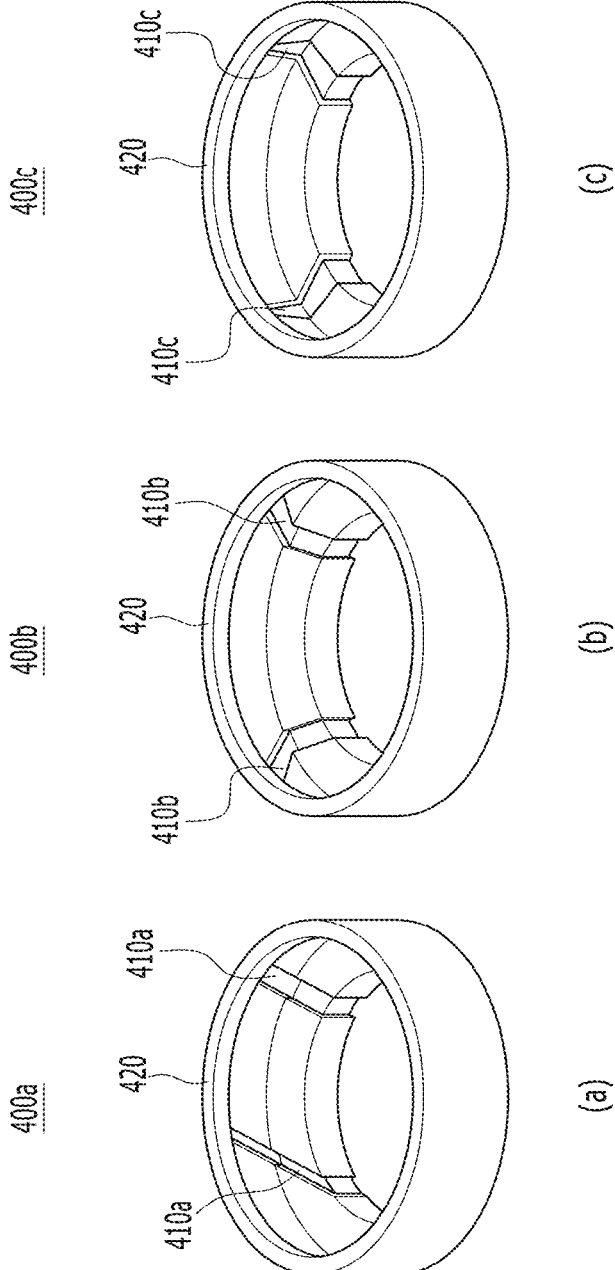
FIGS. 7a to 7c are perspective views showing gaskets according to modified embodiments of the present disclosure.

FIGS. 7a to 7c are perspective views showing gaskets according to modified embodiments of the present disclosure. First, referring to FIG. 7a, the indented part 410a formed in the gasket 400a according to the present embodiment may be connected obliquely along the height direction, unlike the indented part 410 that connects in a straight line shown in FIG. 5.

Next, referring to FIG. 7b, the indented part 410b formed in the gasket 400b according to the present embodiment may be connected in a zigzag pattern along the height direction.

Gas generated in the activation step is discharged through the indented parts 410a and 410b that are connected in an oblique or zigzag shape, and at the same time, the leakage of the electrolyte or the generation of bubbles can be minimized.

Next, referring to FIG. 7c, the indented part 410c formed in the gasket 400c according to the present embodiment may increase in width as it goes from one end to the other end. More specifically, as the indented part 410c moves along the height direction, a trapezoidal shape may be formed in which the width increases as it goes from one end at which the sealing part 420 is positioned, to the other end part facing the one end part.

Gas generated in the activation step is discharged through the indented part 410c which increases in width as it goes from one end to the other end, and at the same time, the contact of the electrode assembly or electrolyte housed inside the battery case with the atmosphere can be minimized.

Figure 8:
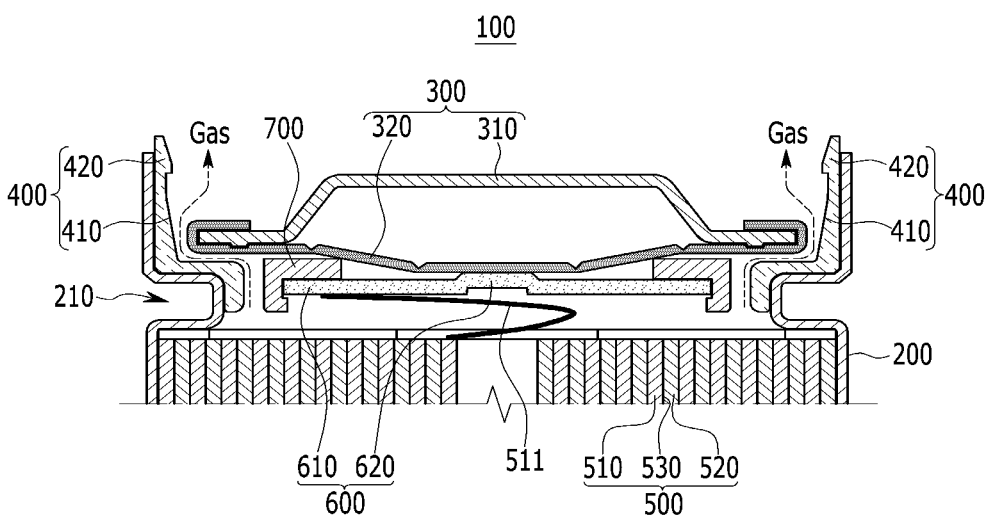
FIGS. 8 and 9 are partial cross-sectional views explaining a method for manufacturing a secondary battery according to an embodiment of the present disclosure.
Figure 9:
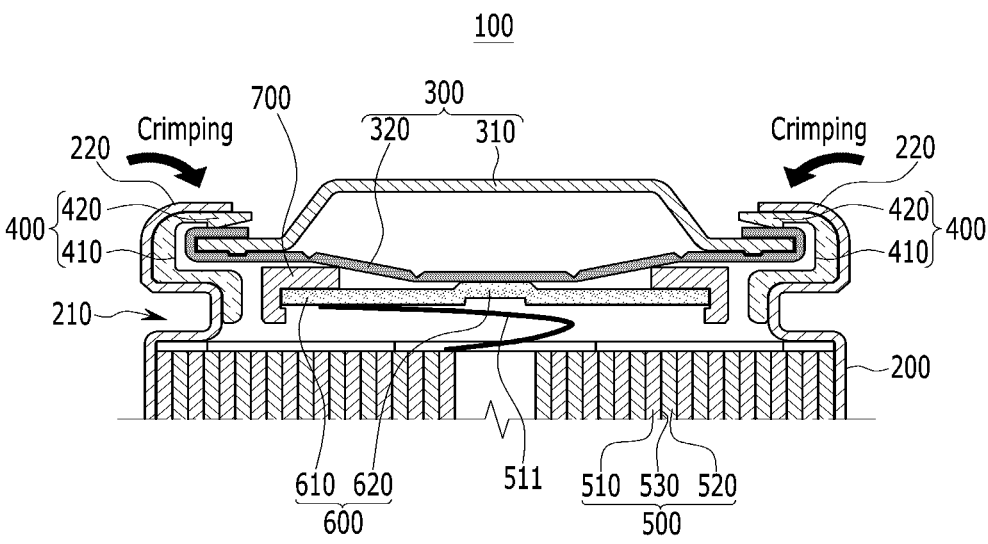

Hereinafter, a method of manufacturing a secondary battery according to an embodiment of the present disclosure will be described in detail with reference to FIGS. 8 and 9. FIGS. 8 and 9 are partial cross-sectional views explaining a method for manufacturing a secondary battery according to an embodiment of the present disclosure. Specifically, FIG. 8 is a partial cross-sectional view of the upper part of the secondary battery 100 before crimping and coupling between the battery case 200 and the cap assembly 300, and FIG. 9 is a partial cross-sectional view of the upper part of the secondary battery 100 after crimping and coupling between the battery case 200 and the cap assembly 300.

First, referring to FIG. 8, a method for manufacturing a secondary battery 100 according to an embodiment of the present disclosure includes the steps of: housing an electrode assembly 500 inside a battery case 200, injecting an electrolyte solution into the electrode assembly 500; positioning a cap assembly 300 and a gasket 400 on the electrode assembly 500, and charging and discharging the electrode assembly 500 to activate the electrode assembly 500.

After the electrode assembly 500 is housed inside the battery case 200, a step of indenting the battery case 200 in the center direction of the electrode assembly 500 from the upper part of the electrode assembly 500 to form the beading part 210 may be continued.

After that, a step of charging and discharging the electrode assembly 500 to activate the electrode assembly 500 may be continued, wherein the step of activating the electrode assembly 500 corresponds to a formation step, that is, an activation step. The activation step is a step of charging and discharging the secondary battery to activate the secondary battery. Lithium ions emitted from the cathode 510 during charging move to the anode 520 and are intercalated. At this time, a solid electrolyte interface (SEI) film is formed on the surface of the anode 520. Such activation step is generally performed by repeating charge/discharge with a constant current or constant voltage in a certain range.

In this activation step, a large amount of gas is generated due to the formation of the electrode film or the decomposition of moisture inside the cell. Since the amount of gas generated in the activation step is large and it continuously reacts with the electrode film, it is necessary to discharge it.

At this time, the gasket 400 according to the present embodiment includes an indented part 410 formed inside, and the indented part 410 is spaced apart from the cap assembly 300 while facing the cap assembly 300. In the step of activating the electrode assembly 500, the generated gas is discharged to the outside along the indented part 410. More specifically, it may be discharged to the outside along a moving passage formed between the indented part 410 and the cap assembly 300.

Since the gas generated in the activation step can be discharged in this way, it is possible to prevent an increase in the internal pressure and a decrease in performance of the secondary battery 100. More specifically, it is possible to prevent expansion and deformation of the electrode assembly 500 and also to prevent the problem of inducing lithium precipitation due to residual gas bubbles. Next, referring to FIG. 9, the gasket 400 according to the present embodiment includes a sealing part 420 that seals between the battery case 200 and the cap assembly 300 while being positioned at one end of the indented part 410. Further, the method for manufacturing the secondary battery 100 according to the present embodiment may further include a step of crimping and coupling the battery case 200 and the cap assembly 300 with the gasket 400 interposed therebetween, and in the crimping and coupling step, the sealing part 420 may make contact with the upper cap assembly 300 to seal between the battery case 200 and the cap assembly 300. After the gas is discharged to the outside through the indented part 410 in the activation step, the sealing part 420 passes through the crimping and coupling step and can interrupt a discharge path via the indented part 410. In other words, in the present embodiment, the indented part 410 is formed in the gasket 400 to secure a path for gas discharge during the activation step, and at the same time, a sealing part 420 protruding from one end of the indented part 410 can be formed to secure the sealing function of the gasket 400.

Meanwhile, as shown in FIG. 6, the concave-convex part 421 is formed on the surface of the sealing part 420 in contact with the cap assembly 300, so that the degree of sealing can be increased. The details overlap with the contents described above, and therefore, is omitted herein.

Figure 10:
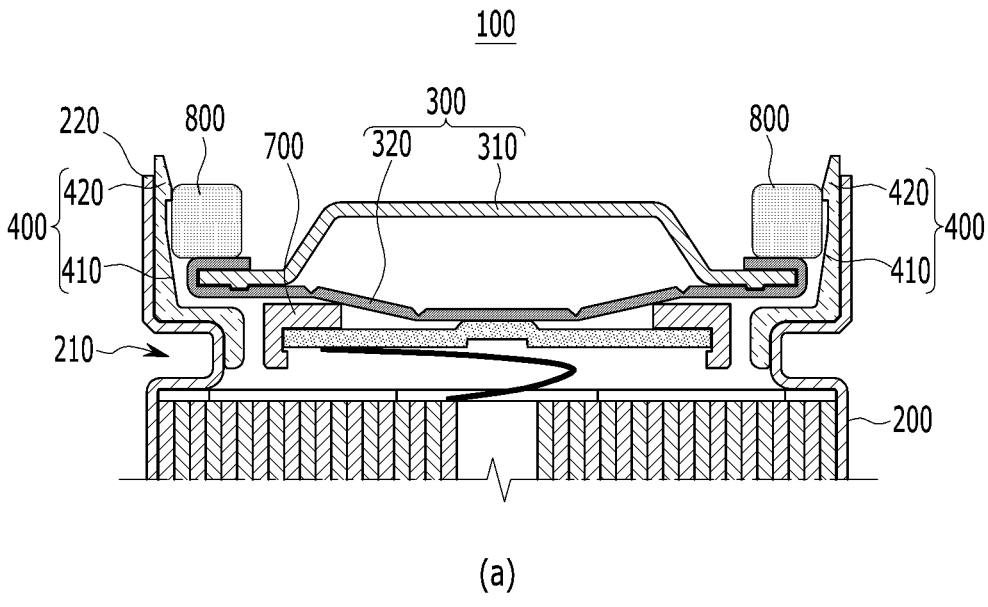
FIG. 10a is a partial cross-sectional view explaining the step of disposing the auxiliary ring according to an embodiment of the present disclosure.
FIG. 10b is a perspective view of an auxiliary ring according to an embodiment of the present disclosure.
Figure 10:
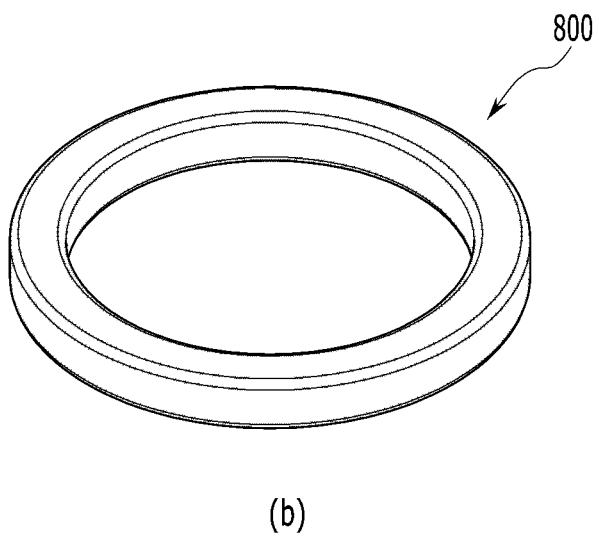

FIG. 10a is a partial cross-sectional view explaining the step of disposing the auxiliary ring according to an embodiment of the present disclosure, and FIG. 10b is a perspective view of an auxiliary ring according to an embodiment of the present disclosure.

Referring to FIGS. 10a and 10b, the method for manufacturing the secondary battery 100 according to the present embodiment may further include a step of disposing the auxiliary ring 800 on the cap assembly 300. The auxiliary ring 800 is a ring-shaped member, and may make contact with the sealing part 420 to interrupt the path formed by the indented part 410.

The step of disposing the auxiliary ring 800 is preferably performed before the step of activating the electrode assembly 500. Specifically, it may be performed between the step of injecting the electrolyte and the step of activating the electrode assembly 500. More specifically, after injecting an electrolyte solution into the electrode assembly 500 and positioning the cap assembly 300 and the gasket 400 on the electrode assembly 500, the auxiliary ring 800 may be disposed on the cap assembly 300. By disposing the auxiliary ring 800, the contact of the electrolyte solution with the external atmosphere can be minimized through the path formed by the indented part 410 until the electrode assembly 500 is activated after injecting the electrolyte solution into the electrode assembly 500. If the electrolyte solution is exposed to moisture in the outside atmosphere for a certain period of time before the activation step is performed, the performance of the secondary battery may be deteriorated. However, by interrupting the contact path between the electrolyte solution and the external atmosphere during the waiting time until the auxiliary ring 800 according to the present embodiment proceeds with the activation step, these problems can be solved. Subsequently, after removing the auxiliary ring 800, the activation step may be performed.

The material of the auxiliary ring 800 is not particularly limited, and a material having elasticity may be included.

Although the terms representing directions such as front, rear, left, right, upper and lower directions are used herein, it is obvious to those skilled in the art that these merely represent for convenience in explanation, and may differ depending on a position of an observer, a position of an object, or the like.

One or more secondary batteries according to the present embodiment described above can be applied to various devices. Such a device can be applied to a vehicle means such as an electric bicycle, an electric vehicle, or a hybrid vehicle, but the present disclosure is not limited thereto, and is applicable to various devices that can use a secondary battery.

Although preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

100: secondary battery
200: battery case
300: cap assembly
400: gasket
410: indented part
420: sealing part
421: concavo-convex part
800: auxiliary ring

The invention claimed is:

1. A secondary battery comprising:
an electrode assembly impregnated with an electrolyte solution;
a battery case that houses the electrode assembly and the electrolyte solution therein;
a cap assembly coupled to the battery case; and
a gasket positioned between the battery case and the cap assembly, the gasket having an indented part extending into an inside surface thereof, and the indented part being spaced apart from the cap assembly and facing the cap assembly,
wherein the indented part forms a channel extending along a height direction of the gasket, the channel bounded by the cap assembly and interior surfaces of the gasket facing inward toward the channel, the channel configured to receive a flow of gas therethrough between the cap assembly and the interior surfaces of the gasket, to discharge the gas to an outside of the battery case.

2. The secondary battery according to claim 1, wherein the gasket comprises a sealing part that provides a seal between the battery case and the cap assembly, the sealing part being located at an end of the indented part.

3. The secondary battery according to claim 2, wherein the sealing part contacts the cap assembly.

4. The secondary battery according to claim 3, wherein the sealing part has a concave-convex part formed on a surface at which the sealing part contacts the cap assembly.

5. The secondary battery according to claim 1, wherein the indented part has a straight, oblique, or zigzag shape along the height direction of the gasket.

6. The secondary battery according to claim 1, wherein the indented part increases in width from a first end thereof to a second end thereof.

7. The secondary battery according to claim 1, wherein the battery case and the cap assembly are crimped and coupled together with the gasket interposed therebetween the battery case, the cap assembly, and the gasket together forming a crimping part of the battery case.

8. A method for manufacturing a secondary battery, comprising the steps of:
placing an electrode assembly inside a battery case;
injecting an electrolyte solution into the electrode assembly;
positioning a cap assembly and a gasket into the battery case overlying the electrode assembly; and
activating the electrode assembly by charging and discharging the electrode assembly,
wherein the gasket comprises an indented part extending into an inside surface thereof, the indented part being spaced apart from the cap assembly and facing the cap assembly,
wherein the indented part forms a channel extending along a height direction of the gasket, the channel bounded by the cap assembly and interior surfaces of the gasket facing inward toward the channel, and
wherein during the activating of the electrode assembly, generated gas is discharged to an outside of the battery case by flowing along the indented part between the cap assembly and the interior surfaces of the gasket.

9. The method according to claim 8, wherein the gasket comprises a sealing part that seals the battery case to the cap assembly, the sealing part being positioned at an end of the indented part.

10. The method according to claim 9, further comprising crimping and coupling the battery case and the cap assembly together with the gasket interposed therebetween, wherein during the crimping and coupling, the sealing part contacts the cap assembly.

11. The method according to claim 10, wherein the sealing part has a concave-convex part is-formed on a surface at which the sealing part contacts the cap assembly.

12. The method according to claim 9, further comprising disposing an auxiliary ring on the cap assembly, the auxiliary ring contacting the sealing part and blocking a path formed by the indented part between an inside of the battery case and an outside of the battery case.

13. The method according to claim 12, wherein the disposing of the auxiliary ring is performed before the activating of the electrode assembly.

* * * * *